US008667441B2

(12) United States Patent
Alpert et al.

(10) Patent No.: US 8,667,441 B2
(45) Date of Patent: Mar. 4, 2014

(54) CLOCK OPTIMIZATION WITH LOCAL CLOCK BUFFER CONTROL OPTIMIZATION

(75) Inventors: Charles J. Alpert, Austin, TX (US); Zhuo Li, Austin, TX (US); Gi-Joon Nam, Austin, TX (US); David A. Papa, Austin, TX (US); Chin Ngai Sze, Austin, TX (US); Natarajan Viswanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 12/947,445

(22) Filed: Nov. 16, 2010

(65) Prior Publication Data

US 2012/0124539 A1    May 17, 2012

(51) Int. Cl.
*G06F 17/50* (2006.01)
*G06F 9/455* (2006.01)

(52) U.S. Cl.
USPC ........... 716/114; 716/113; 716/119; 716/122; 716/134; 716/110

(58) Field of Classification Search
None
See application file for complete search history.

(56) References Cited

U.S. PATENT DOCUMENTS

| | | | |
|---|---|---|---|
| 4,873,459 A | 10/1989 | El Gamal et al. | |
| 5,014,419 A | 5/1991 | Cray et al. | |
| 5,129,830 A | 7/1992 | Krajewski et al. | |
| 5,152,696 A | 10/1992 | Krajewski et al. | |
| 5,726,902 A | 3/1998 | Mahmood et al. | |
| 5,787,459 A | 7/1998 | Stallmo et al. | |
| 5,825,661 A | 10/1998 | Drumm | |
| 5,896,299 A | 4/1999 | Ginetti et al. | |
| 6,080,201 A * | 6/2000 | Hojat et al. | 703/14 |
| 6,189,131 B1 | 2/2001 | Graef et al. | |
| 6,442,745 B1 | 8/2002 | Arunachalam et al. | |
| 6,536,024 B1 * | 3/2003 | Hathaway | 327/295 |

(Continued)

FOREIGN PATENT DOCUMENTS

| | | | |
|---|---|---|---|
| JP | 11145297 A | 5/1999 | |
| JP | 2000322458 A | 11/2000 | |
| JP | 2001134625 A | 5/2001 | |
| JP | 2004356780 | 12/2004 | |

OTHER PUBLICATIONS

D. Papa et al., Physical Synthesis With Clock-Network Optimization for Large Systems on Chips, IEEE Micro, pp. 51-62, Jul. 2011.*

(Continued)

*Primary Examiner* — A. M. Thompson
(74) *Attorney, Agent, or Firm* — Stephen R. Tkacs; Stephen J. Walder, Jr.; Eustus D. Nelson

(57) ABSTRACT

A physical synthesis tool for dock optimization with local clock buffer control optimization is provided. The physical synthesis flow consists of delaying the exposure of clock routes until after the clock optimization placement stage. The physical synthesis tool clones first local clock buffers. Then, the physical synthesis tool runs timing analysis on the whole design to compute the impact of this necessarily disruptive step. After cloning local clock buffers, the physical synthesis tool adds an extra optimization step to target the control signals that drive the local clock buffers. This optimization step may includes latch cloning, timing-driven placement, buffer insertion, and repowering. The flow alleviates high-fanout nets and produces significantly better timing going into clock optimization placement. After placement, the physical synthesis tool fixes latches and local clock buffers in place, inserts clock routes, and repowers local clock buffers.

20 Claims, 11 Drawing Sheets

(56) References Cited

U.S. PATENT DOCUMENTS

| | | | |
|---|---|---|---|
| 6,725,438 | B2 | 4/2004 | van Ginneken |
| 6,973,473 | B1 | 12/2005 | Novaes et al. |
| 7,039,891 | B2 | 5/2006 | Tetelbaum |
| 7,043,562 | B2 | 5/2006 | Dally et al. |
| 7,222,311 | B2 | 5/2007 | Kaufman et al. |
| 7,284,222 | B1 | 10/2007 | Rohe et al. |
| 7,342,414 | B2 | 3/2008 | DeHon et al. |
| 7,367,005 | B2 | 4/2008 | Kosugi et al. |
| 7,379,424 | B1 | 5/2008 | Krueger |
| 7,395,524 | B2 * | 7/2008 | Roesner et al. ............... 717/114 |
| 7,555,566 | B2 | 6/2009 | Blumrich et al. |
| 7,613,900 | B2 | 11/2009 | Gonzalez et al. |
| 7,679,401 | B1 | 3/2010 | Redgrave |
| 7,694,242 | B1 * | 4/2010 | Li et al. .................. 716/100 |
| 7,761,687 | B2 | 7/2010 | Blumrich et al. |
| 7,979,732 | B2 * | 7/2011 | Curley et al. ............... 713/600 |
| 8,074,190 | B1 * | 12/2011 | Li et al. .................. 716/100 |
| 8,370,782 | B2 | 2/2013 | Alpert et al. |
| 8,407,660 | B2 | 3/2013 | Solomon |
| 2004/0128341 | A1 | 7/2004 | Synek et al. |
| 2006/0149506 | A1 | 7/2006 | Cutuli et al. |
| 2008/0022079 | A1 | 1/2008 | Archer et al. |
| 2008/0148203 | A1 | 6/2008 | Alpert et al. |
| 2008/0295073 | A1 * | 11/2008 | Roesner et al. ............... 717/114 |
| 2009/0064073 | A1 | 3/2009 | Alpert et al. |
| 2009/0070549 | A1 | 3/2009 | Solomon |
| 2009/0193376 | A1 | 7/2009 | Alpert et al. |
| 2009/0193377 | A1 | 7/2009 | Puri et al. |
| 2009/0292383 | A1 | 11/2009 | Bohl et al. |
| 2009/0319977 | A1 | 12/2009 | Saxena et al. |
| 2010/0251234 | A1 | 9/2010 | Oshins |
| 2011/0055786 | A1 | 3/2011 | Gao |
| 2011/0055791 | A1 | 3/2011 | Gao |
| 2011/0320992 | A1 | 12/2011 | Alpert et al. |
| 2012/0146099 | A1 | 6/2012 | Geer et al. |
| 2012/0286331 | A1 | 11/2012 | Aton et al. |

OTHER PUBLICATIONS

Hu, Jin et al., "Completing High-Quality Global Routes", Proc. Int'l Symp. on Physical Design (ISPD), Mar. 2010, 7 pages.

McMurchie, Larry et al., "PathFinder: A Negotiation-Based Performance-Driven Router for FPGAs", In Proc. ACM Symp. on FPGAs, 1995, pp. 111-117.

Moffitt, Michael D., "Automated Planning in Physical Synthesis", USPTO U.S. Appl. No. 12/855,009, filed Aug. 12, 2010, 37 pages.

Tsai, Jeng-Liang, "Clock Tree Synthesis for Timing Convergence and Timing Yield Improvement in Nanometer Technologies", University of Wisconsin—Madison, 2005, 123 pages. (pp. 1-62).

Tsai, Jeng-Liang, "Clock Tree Synthesis for Timing Convergence and Timing Yield Improvement in Nanometer Technologies", University of Wisconsin—Madison, 2005, 123 pages (pp. 63-123).

Viswanathan, Natarajan et al., "ITOP: Integrating Timing Optimization within Placement", ISPD'10, San Francisco, California, Mar. 14-17, 2010, pp. 83-90.

Zhu, Yi et al., "Advancing Supercomputer Performance Through Interconnection Topology Synthesis", IEEE/ACM International conference on Computer-Aided Design (ICCAD), Nov. 10-13, 2008, San Jose, CA, USA, pp. 555-558.

U.S. Appl. No. 13/008,935.

"Cray XT3TM Supercomputer Scalable by Design", Cray XT3 Datasheet, 2004-2005, 6 pages.

Hemenway, Roe et al., "An Optical Packet-Switched Interconnect for Supercomputer Applications*", Submitted as an invited paper in Journal of Optical Networking, Special Issue on Supercomputer Interconnects, Oct. 2004, 16 pages.

Lakshin, G. L. et al., "ECL LSI Design and Test Experience in Supercomputer Development", INSPEC; Proceedings of the Third Eurochip Workshop on VLSI Design Training, 21-26, CMP/EUROCHIP, Grenoble, France, 1992, 1 page.

Moller, Dietmar P. et al., "Simulation of an Embedded Processor Kernel Design on SRAM-Based FPGA". Proceedings of the SCS, Jul. 1999, 6 pages.

Yang, Q. et al., "WDM/TDM Optical Packet Switched Network for Supercomouting", Optics in Computing 2000, SPIE, vol. 4089, 2000, pp. 555-561.

U.S. Appl. No. 13/572,144.

U.S. Appl. No. 13/189,991.

Interview Summary dated Nov. 18, 2013 for U.S. Appl. No. 13/008,935, 3 pages.

Interview Summary dated Dec. 11, 2013 for U.S. Appl. No. 13/572,144, 8 pages.

Interview Summary dated Dec. 12, 2013 for U.S. Appl. No. 13/189,991, 11 pages.

Office Action mailed Sep. 23, 2013 for U.S. Appl. No. 13/189,991, 18 pages.

Office Action mailed Sep. 24, 2013 for U.S. Appl. No. 13/572,144, 18 pages.

Office Action mailed Sep. 27, 2013 for U.S. Appl. No. 13/008,935, 22 pages.

Response to Office Action filed Nov. 22, 2013, U.S. Appl. No. 13/008,935, 16 pages.

Response to Office Action filed Dec. 10, 2013, U.S. Appl. No. 13/189,991, 18 pages.

Response to Office Action mailed filed Dec. 10, 2013, U.S. Appl. No. 13/572,144, 12 pages.

* cited by examiner

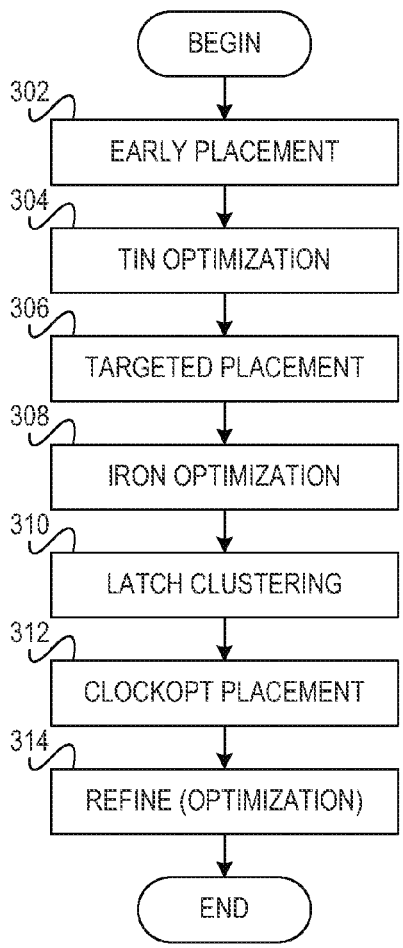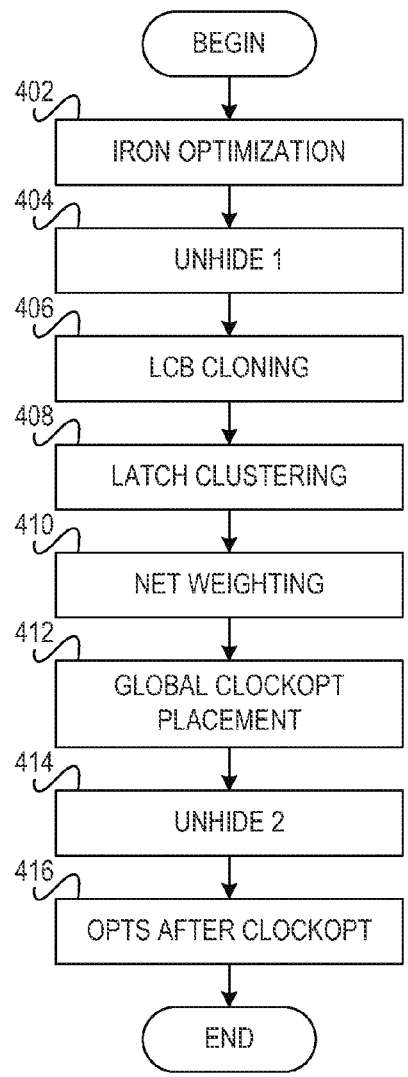

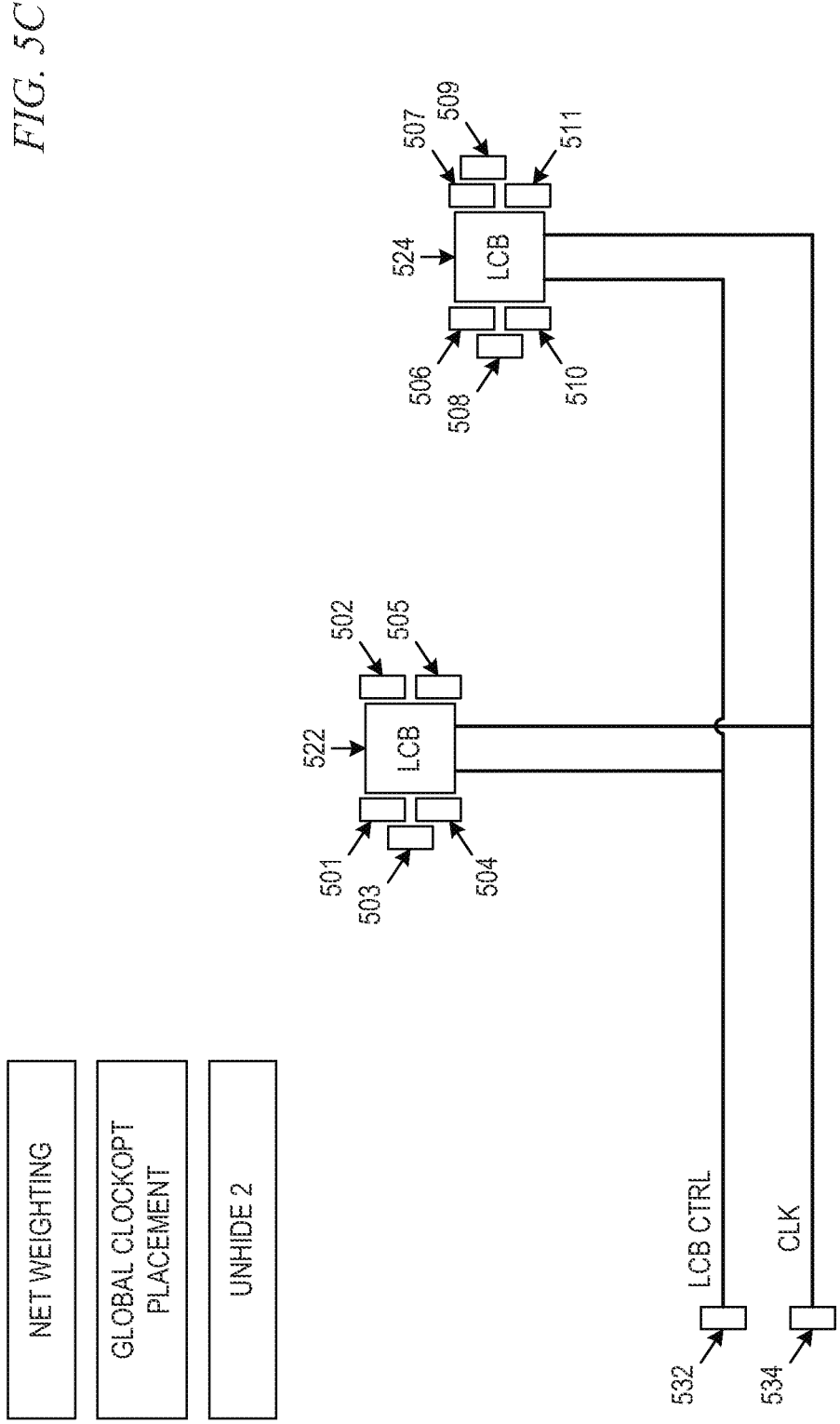

CLOCK OPTIMIZATION WITH LOCAL CLOCK BUFFER CONTROL OPTIMIZATION

BACKGROUND

The present application relates generally to an improved data processing apparatus and method and more specifically to mechanisms for clock optimization with local clock buffer control optimization.

Physical synthesis of an integrated circuit device traditionally begins with a mapped netlist. A netlist describes the connectivity of an electronic design. Netlists usually convey connectivity information and provide nothing more than instances, nets, and perhaps some attributes. Physical synthesis comprises computing an optimized netlist and corresponding layout. The objective of optimization is to meet timing constraints while minimizing area, routing congestion, and power consumption.

For efficiency reasons, physical synthesis employs heuristic approaches, starting with large changes and inexpensive analyses early in the design flow and then transitioning to more expensive analyses and restricting consideration to small changes as the design converges.

SUMMARY

In one illustrative embodiment, a method, in a data processing system, is provided for clock optimization with local clock buffer control optimization. The method comprises receiving, by the data processing system, an integrated circuit design. The method further comprises cloning, by the data processing system, at least one local clock buffer to generate a plurality of local clock buffers in the integrated circuit design. The method further comprises performing, by the data processing system, latch clustering to associate latches in the integrated circuit design with respective ones of the plurality of local clock buffers. The method further comprises explosing, by the data processing system, local clock buffer control timing in the integrated circuit design. The method further comprises performing, by the data processing system, local clock buffer control optimization to optimize paths of control signals that drive the plurality of local clock buffers in the integrated circuit design to form an optimized integrated circuit design.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a flowchart illustrating a placement driven synthesis flow in accordance with an illustrative embodiment;

FIG. 4 is a flowchart of clock optimization in a physical synthesis flow in accordance with one illustrative embodiment;

FIGS. 5A-5C are diagrams depicting clock optimization of an integrated circuit in a physical synthesis flow in accordance with one illustrative embodiment;

DETAILED DESCRIPTION

The illustrative embodiments provide a physical synthesis tool for clock optimization with local clock buffer control optimization. Through careful order of optimizations, a physical synthesis tool can avoid or repair disruptions during the clock optimization stage of the placement driven synthesis (PDS) flow. Through this optimization, the physical synthesis tool can improve the overall flow significantly. The new flow consists of delaying the exposure of clock routes until after the clock optimization placement stage. The physical synthesis tool clones first local clock buffers. Then, the physical synthesis tool runs timing analysis on the whole design to compute the impact of this necessarily disruptive step. After cloning local clock buffers, the physical synthesis tool adds an extra optimization step to target the control signals that drive the local clock buffers. In one embodiment, this optimization step includes latch cloning, timing-driven placement, buffer insertion, and repowering. The flow alleviates high-fanout nets and produces significantly better timing going into clock optimization placement. After placement, the physical synthesis tool fixes latches and local clock buffers in place, inserts clock routes, and repowers local clock buffers.

Figure 1:
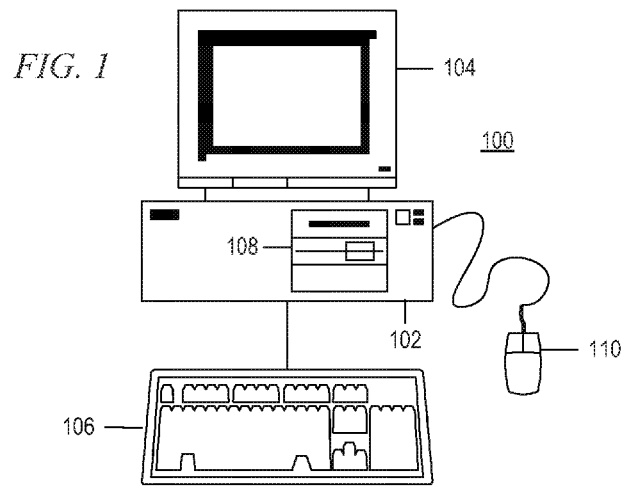
FIG. 1 is a pictorial representation of a data processing system in which aspects of the illustrative embodiments may be implemented.
Figure 2:
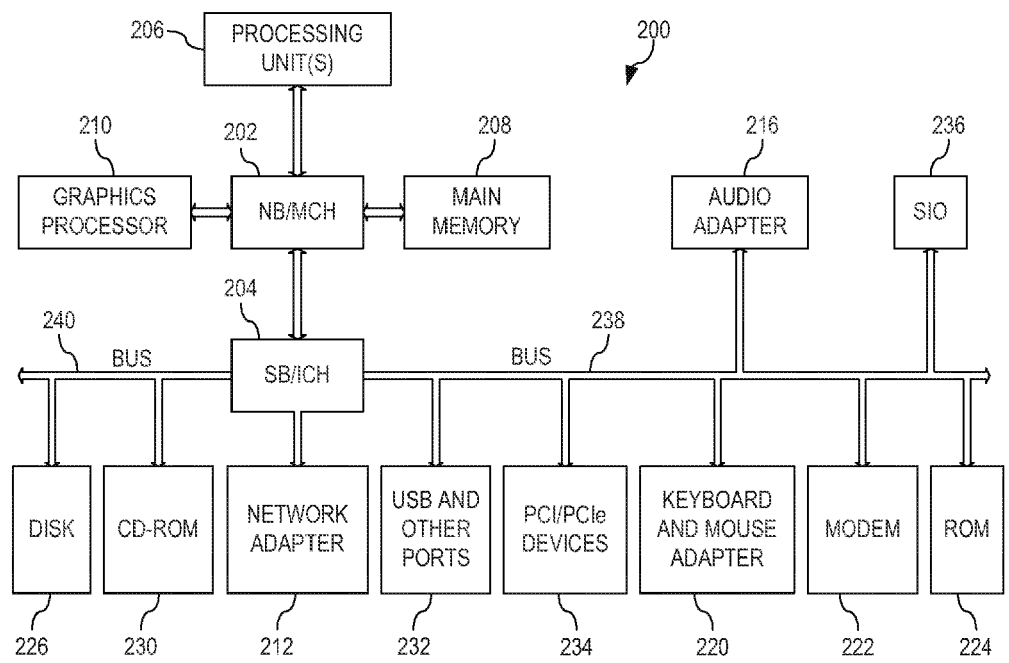
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is a pictorial representation of a data processing system in which aspects of the illustrative embodiments may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM® eServer™ System p® computer system, which are products of International Business Machines Corporation, located in Armonk, N.Y. (eServer, System p, and AIX are trademarks of International Business Machines Corporation in the United States, other countries, or both). Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

FIG. 2 is a block diagram of an example data processing system in which aspects of the illustrative embodiments may be implemented. Data processing system 200 is an example of a computer, such as computer 100 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 3 is a flowchart illustrating a placement driven synthesis flow in accordance with an illustrative embodiment. Design flows are the explicit combination of electronic design automation tools to accomplish the design of an integrated circuit (IC). Moore's law has driven the entire IC implementation design flows from one which uses primarily standalone synthesis, placement, and routing algorithms to an integrated construction and analysis flows for design closure. The challenges of rising interconnect delay led to a new way of thinking about and integrating design closure tools. New scaling challenges such as leakage power, variability, and reliability challenge the current state of the art in design closure.

Operation begins, and the physical synthesis tool performs early placement (block 302). Placement is the portion of the physical synthesis flow that assigns exact locations for various circuit components within the chip's core area. An inferior placement assignment will not only affect the circuit's performance but might also make it unable to be manufactured by producing excessive wirelength, which is beyond available routing resources. Consequently, a placer must perform the assignment while optimizing a number of objectives to ensure that a circuit meets its performance demands.

The physical synthesis tool then performs tin optimization (block 304) and targeted placement (block 306). The physical synthesis tool performs iron optimization (block 308). Tin optimization is a circuit optimization phase that follows early placement. Tin optimization includes electrical correction, critical path optimization, critical path histogram compression, and area recovery. Tin optimization crucially lacks any calls to legalization. Targeted placement is a global placement algorithm that includes the impact of timing-driven net weighting. Iron optimization is the same as tin optimization but also includes several calls to legalization and produces a legalized placement result.

Then, the physical synthesis tool performs latch clustering (block 310). A local clock buffer (LCB) is a component that distributes clock signals. A typical clock control system has a clock generation circuit (e.g., a phase-lock loop (PLL) circuit) that generates a master clock signal, which is fed to a clock distribution network that renders synchronized global clock signals at the LCBs. Each LCB adjusts the global clock duty cycle and edges to meet the requirements of respective circuit elements, e.g., local logic circuits or latches. Because this clock network is one of the largest power consumers among all interconnects, it is further beneficial to control the capacitive load of the LCBs, each of which is driving a set of many clock sinks. One approach for reducing the capacitive load is latch clustering, i.e., clusters of latches placed near the respective LCB of their clock domain. Latch clustering combined with LCBs can significantly reduce the total clock wire capacitance, which in turn reduces overall clock power consumption. Because most of the latches are placed close to an LCB, latch clustering reduces clock skew, which helps improve the timing of the circuit.

The physical synthesis tool performs clockopt placement (block 312). The term "clockopt" refers to the stage of synthesis flow having to do with clock optimization. The physical synthesis tool performs the refine (optimization) stage of the physical synthesis flow (block 314). Thereafter, operation ends. The refine stage is an iterative optimization stage that gradually increases the accuracy of analysis and decreases the size of placement bins so that optimization provides solutions that are closer and closer to legal. In the most accurate phase of refine, each optimization must find a legal solution before accepting it.

Serious degradations result from targeted placement and the clockopt stage of synthesis flow. After cloning the LCBs, control signals are not optimized, such that the clock nets cause terrible net weights. Furthermore, high latch displacement results from clustering latches to an LCB. Further optimizations are necessary after clockopt placement. Also, latch clustering may result in overlaps between latch clusters and obstacles.

FIG. 4 is a flowchart of clock optimization in a physical synthesis flow in accordance with one illustrative embodiment. Operation begins, and the physical synthesis tool performs iron optimization (block 402). The physical synthesis tool performs a first unhide operation (block 404). Next, the physical synthesis tool performs local clock buffer (LCB) cloning (block 406) and latch clustering (block 408). The physical synthesis tool performs net weighting (block 410), global clockopt placement (block 412), and a second unhide operation (block 414). The first and second unhide operations are the same, but based on different stages of the design the results are different. Particularly, before the LCBs are cloned, the effect is to expose the clock timing. The second unhide operation reasserts the timing for the new LCBs, which must be repeated after LCB cloning, except without exposing the dock timing. Thereafter, the physical synthesis tool performs optimizations after clockopt (block 416), and operation ends.

During net weighting, the physical synthesis tool runs a timing analysis to determine the timing critical paths in the design. Subsequently, the physical synthesis tool assigns the nets incident on the critical path (timing critical nets) a weight that is higher than the default net weight assigned to a non-critical net. The rationale is that nets that are assigned a higher weight are optimized more during a subsequent placement step. Optimizing critical net lengths during placement would implicitly minimize critical path lengths, leading to better path delay.

Figure 5A:
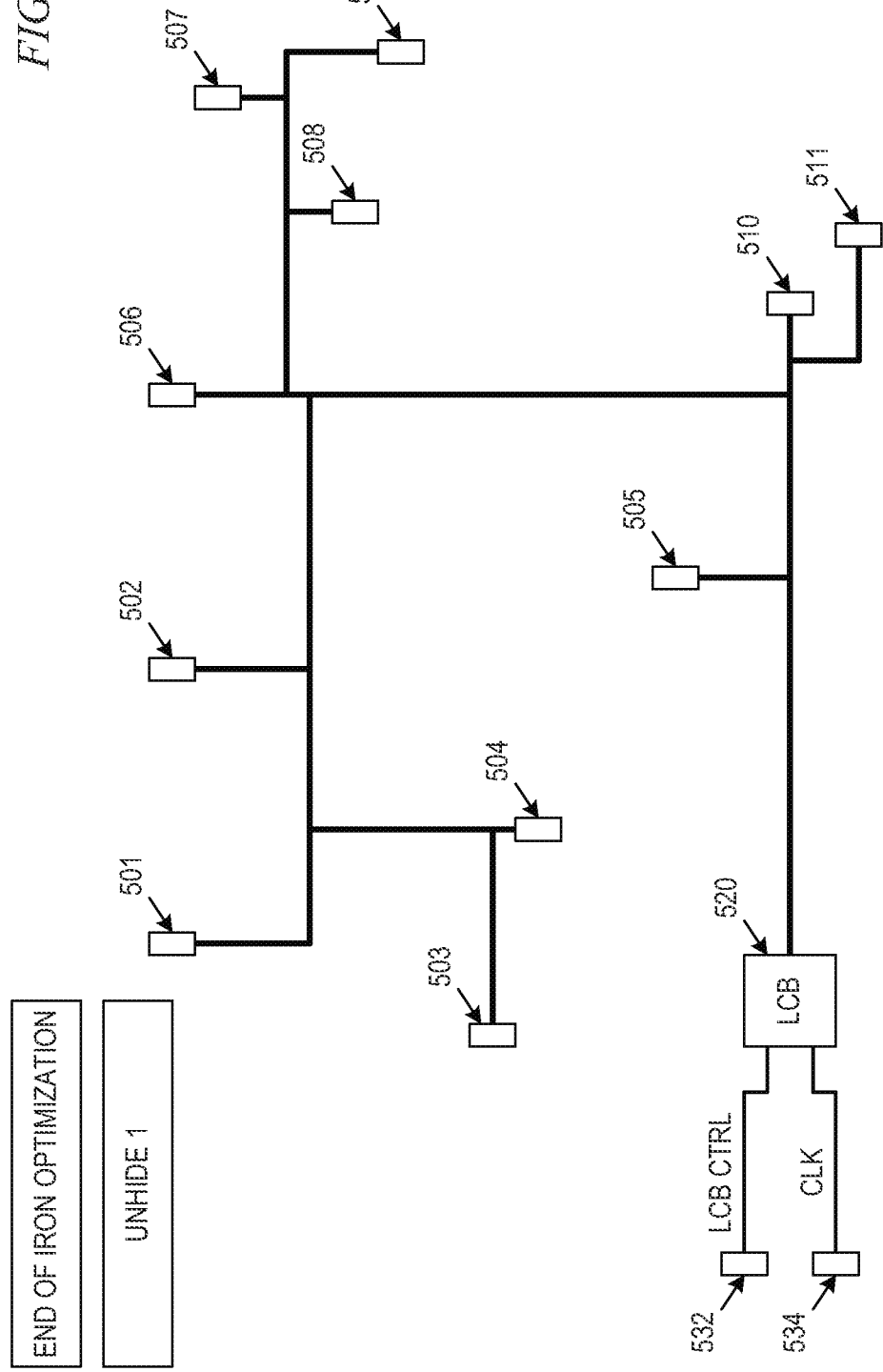
Figure 5B:
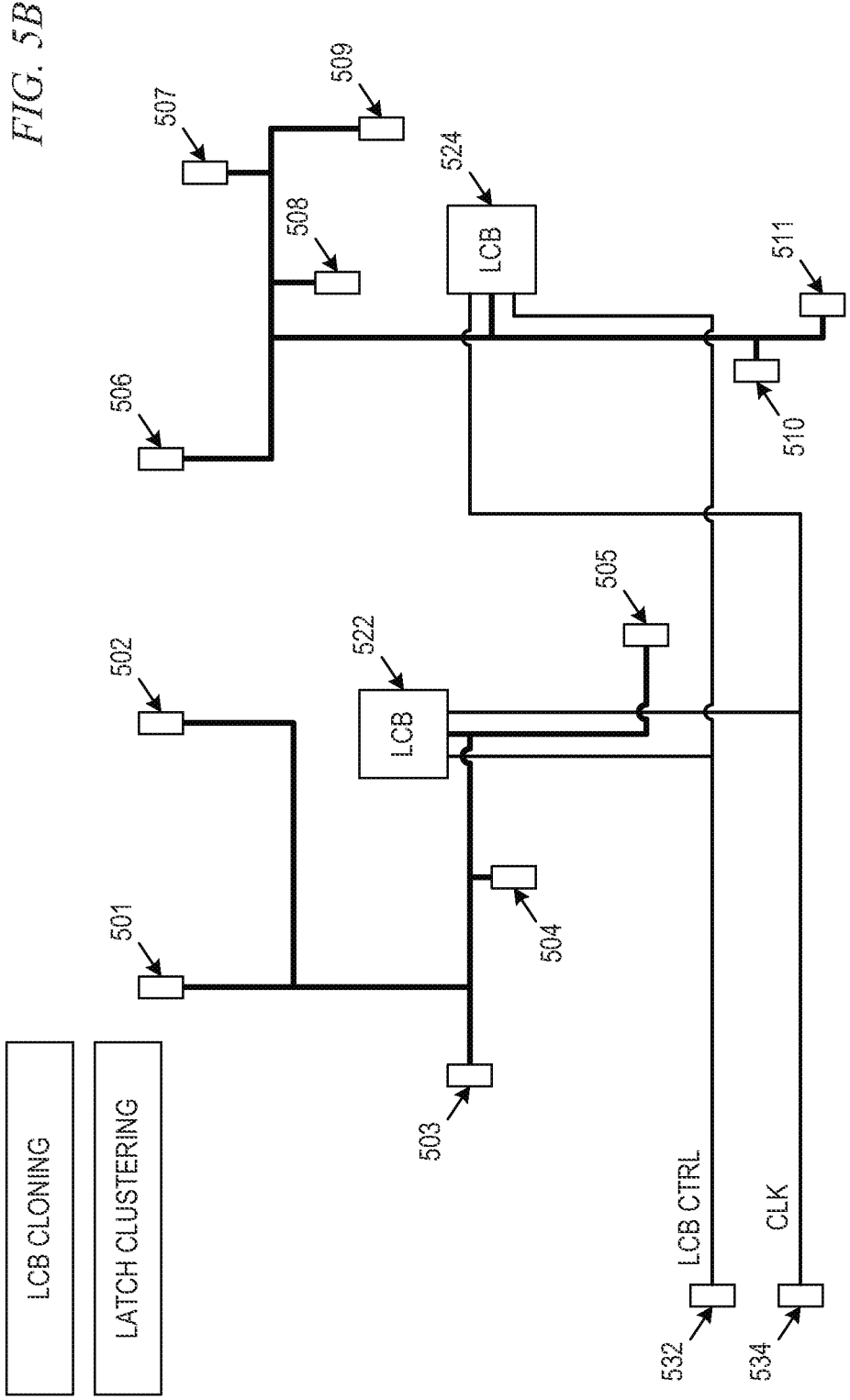

FIGS. 5A-5C are diagrams depicting clock optimization of an integrated circuit in a physical synthesis flow in accordance with one illustrative embodiment. More particularly, FIG. 5A is a diagram depicting an integrated circuit after iron optimization (block 402 in FIG. 4) and the first unhide operation (block 404 in FIG. 4). Local clock buffer (LCB) 520 receives a clock signal from clock 534 and at least one LCB control signal from control element 532. LCB 520 feeds latches 501-511.

FIG. 5B is a diagram depicting the integrated circuit after LCB cloning (block 406 in FIG. 4) and latch clustering (block 408 in FIG. 4). The LCB cloning operation clones LCB 520 into LCB 522 and LCB 524, which receive a dock signal from clock 534 and at least one LCB control signal from control element 532. LCB 522 feeds latches 501-505, and LCB 524 feeds latches 506-511. As seen in FIG. 5B, latches 501-505 are closer to LCB 522 than they were to LCB 520 in FIG. 5A. Similarly, latches 506-511 are closer to LCB 524 than they were to LCB 520 in FIG. 5A.

FIG. 5C depicts the integrated circuit after net weighting (block 410 in FIG. 4), global clockopt placement (block 412 in FIG. 4), and second unhide operation (block 414 in FIG. 4). As seen in FIG. 5C, latches 501-505 are moved to be very close to LCB 522, and latches 506-511 are moved to be very dose to LCB 524.

Figure 6:
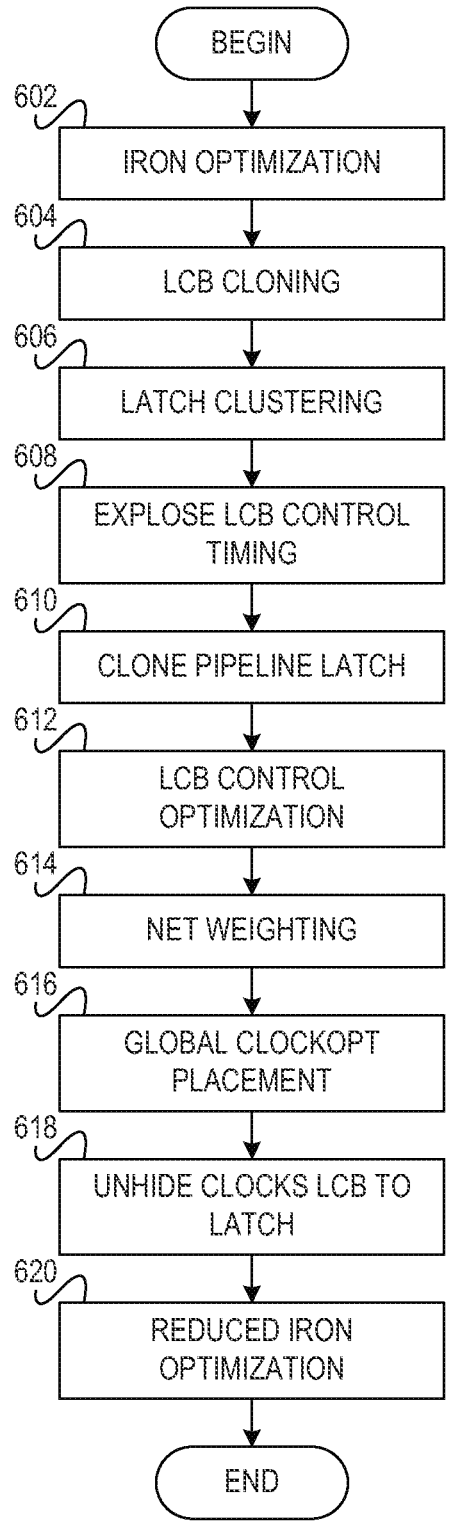
FIG. 6 is a flowchart illustrating operation of clock optimization in a physical synthesis flow with local clock buffer control optimization in accordance with one illustrative embodiment.

FIG. 6 is a flowchart illustrating operation of clock optimization in a physical synthesis flow with local clock buffer control optimization in accordance with one illustrative embodiment. Operation begins, and the physical synthesis tool performs iron optimization (block 602). Next, the physical synthesis tool performs local clock buffer (LCB) cloning (block 604) and latch clustering (block 606).

During initial optimizations, there is only one LCB. Because clocks are ideal, the optimized path easily meets timing constraints. After LCB cloning, the LCB control signal is unoptimized. There is a high fanout net driving all new LCB sinks. The physical synthesis tool exposes LCB control timing (block 608) and clones the pipeline latch (block 610). The control signal paths that drive the LCB may contain pipeline latches. The pipeline latch cloning may separate these latches so that each one drives only a single LCB, allowing significant freedom when placing them.

Then, the physical synthesis tool performs LCB control optimization (block 612). LCB control optimization consists of three steps. The first step is to do timing driven detailed placement of individual gates. The second step is to do simultaneous buffer insertion and layer assignment. The third step is to do timing driven gate repowering. These steps are designed to make sure the LCB control signal meet its timing constraints.

The physical synthesis tool performs net weighting (block 614), global clockopt placement (block 616), and unhides clocks LCB to latch (block 618). When the clocks are unhidden between the LCB and the latch, the timing impact of the clock tree wiring between the LCB and latch is included in the skew value measured at the latch clock pin. Thereafter, the physical synthesis tool performs reduced iron optimization (block 620), and operation ends. Reduced iron optimization is the same as iron optimization without electrical correction.

Figure 7A:
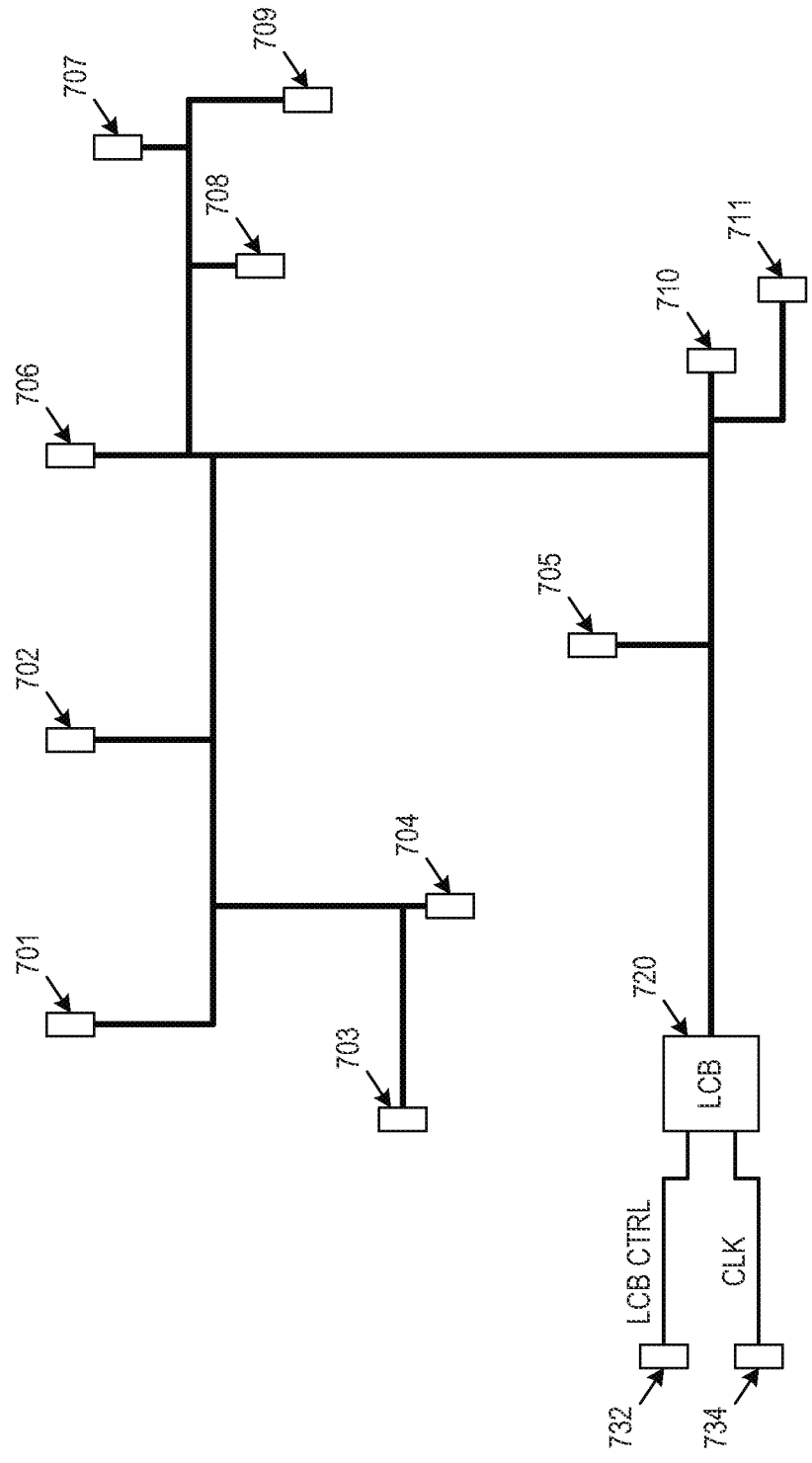
FIGS. 7A-7E are diagrams depicting clock optimization of an integrated circuit in a physical synthesis flow with local clock buffer control optimization in accordance with one illustrative embodiment.

FIGS. 7A-7E are diagrams depicting clock optimization of an integrated circuit in a physical synthesis flow with local clock buffer control optimization in accordance with one illustrative embodiment. More particularly, FIG. 7A is a diagram depicting an integrated circuit after iron optimization (block 602 in FIG. 6). Local clock buffer (LCB) 720 receives a clock signal from clock 734 and at least one LCB control signal from control element 732. LCB 720 feeds latches 701-711.

Figure 7B:
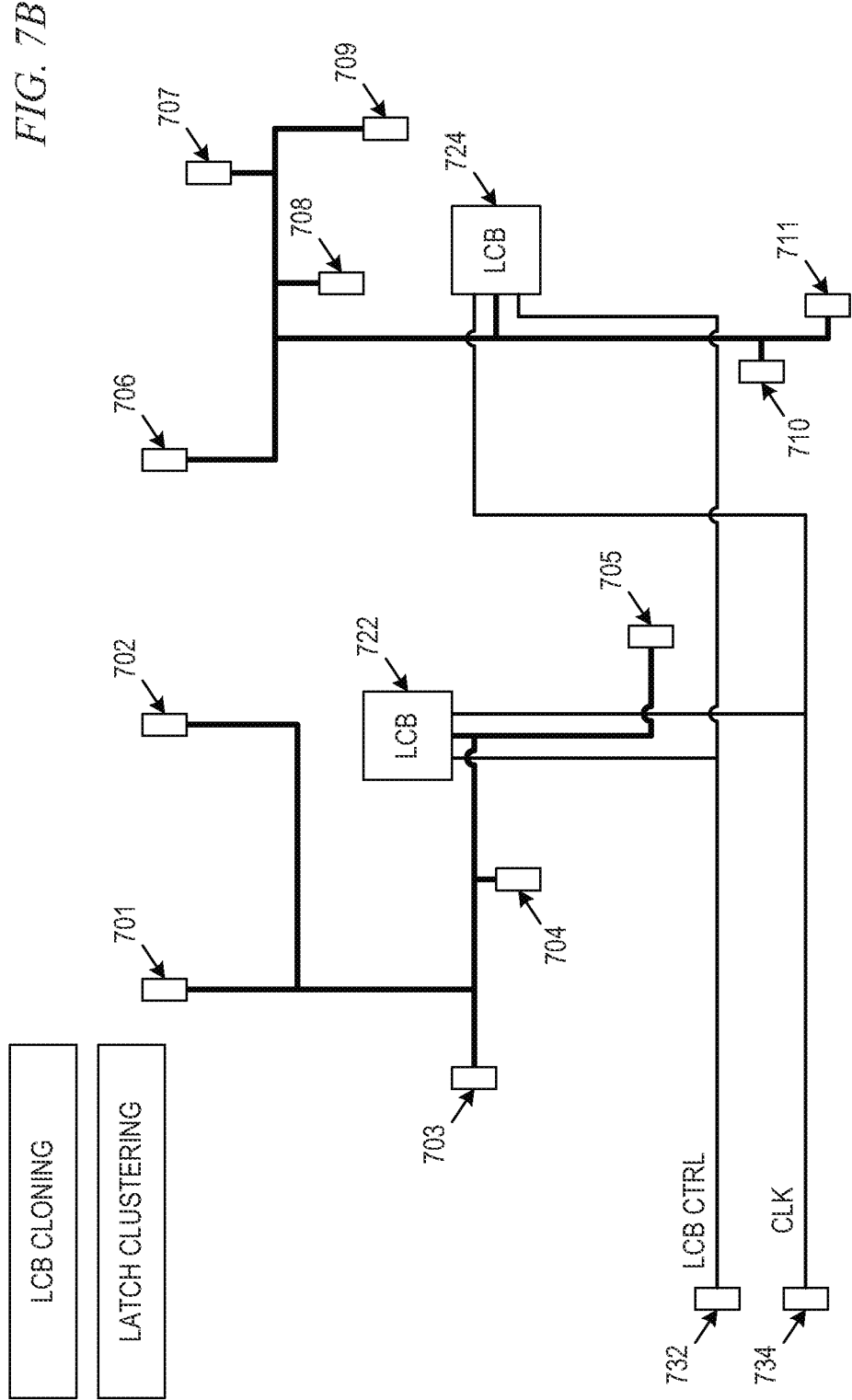

FIG. 7B is a diagram depicting the integrated circuit after LCB cloning (block 604 in FIG. 6) and latch clustering (block 606 in FIG. 6). The LCB cloning operation clones LCB 720 into LCB 722 and LCB 724, which receive a clock signal from clock 734 and at least one LCB control signal from control element 732. LCB 722 feeds latches 701-705, and LCB 724 feeds latches 706-711. As seen in FIG. 7B, latches 701-705 are closer to LCB 722 than they were to LCB 720 in FIG. 7A. Similarly, latches 706-711 are closer to LCB 724 than they were to LCB 720 in FIG. 7A.

Figure 7C:
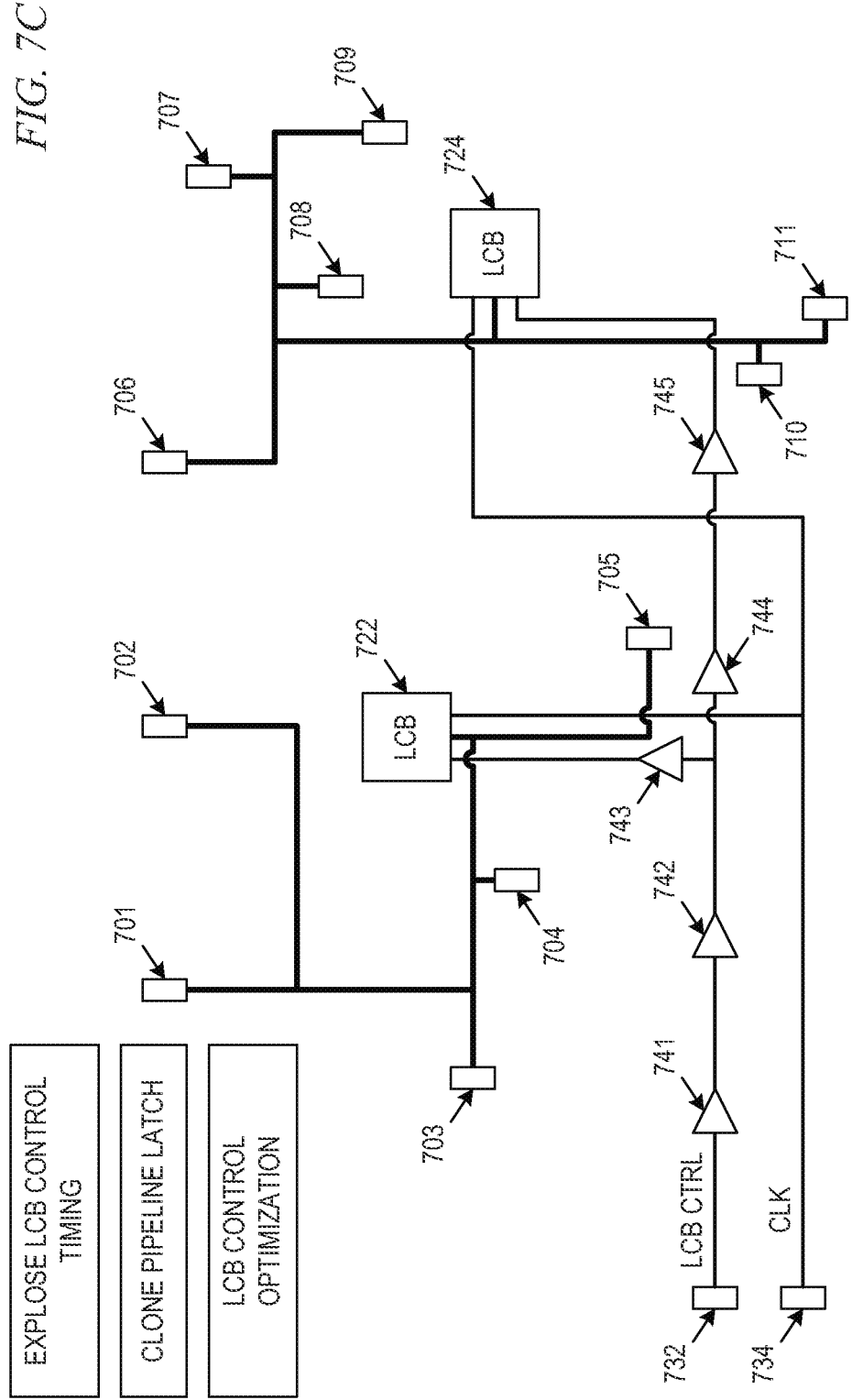

FIG. 7C is a diagram depicting the integrated circuit after exposing LCB control timing (block 608 in FIG. 6), cloning pipeline latch (block 610 in FIG. 6), and LCB control optimization (block 612 in FIG. 6). In accordance with an illustrative embodiment, LCB control optimization includes latch cloning, timing-driven placement, buffer insertion, and repowering. As seen in FIG. 7C, the physical synthesis tool inserts buffers 741-745 for LCB control optimization. This flow alleviates high-fanout nets and produces significantly better timing going into clock optimization placement.

Figure 7D:
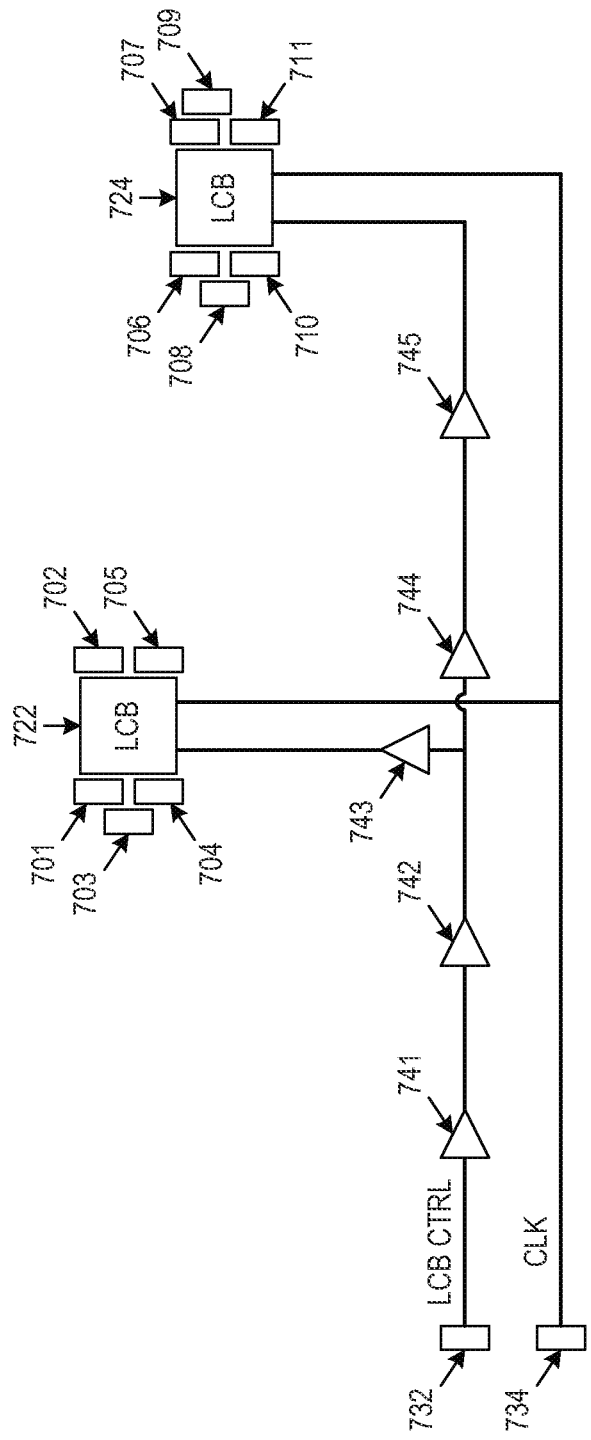

FIG. 7D is a diagram depicting the integrated circuit after net weighting (block 614 in FIG. 6) and global clockopt placement (block 616 in FIG. 6). As seen in FIG. 7D, latches 701-705 are moved to be very close to LCB 722, and latches 706-711 are moved to be very close to LCB 724.

Figure 7E:
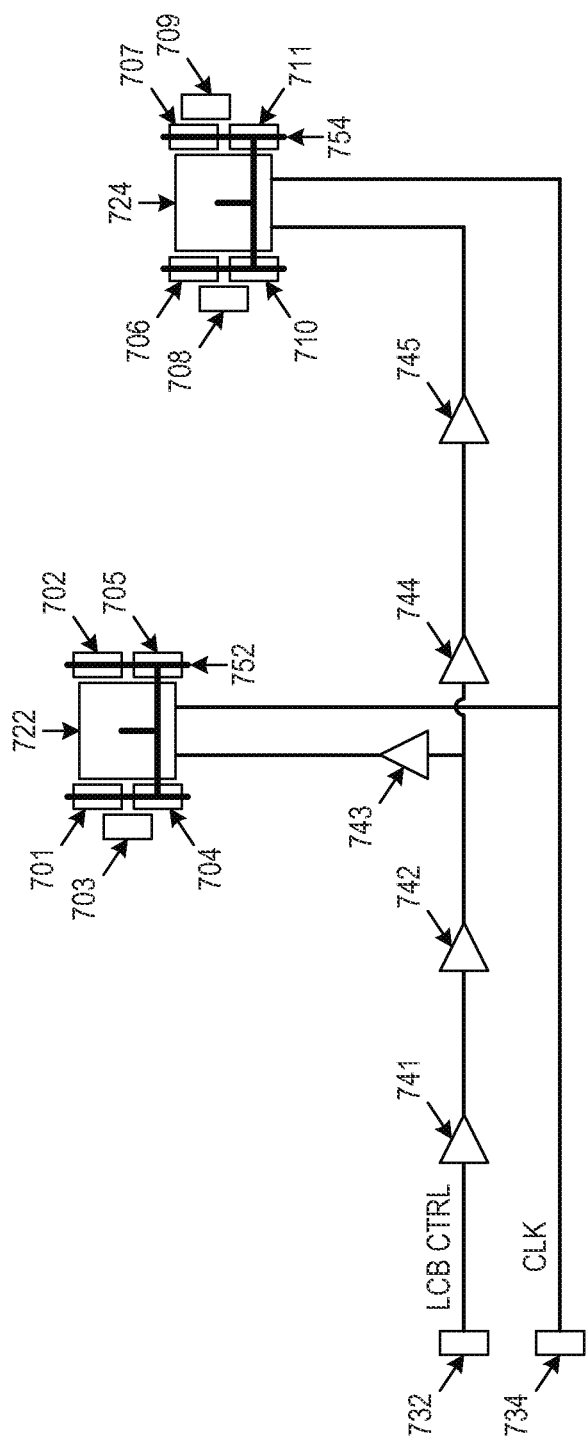

FIG. 7E is a diagram depicting the integrated circuit after unhiding clocks LCB to latch (block 618 in FIG. 6). After clockopt placement, latches 701-711 and LCBs 722, 724 are fixed in place, and the physical synthesis tool can insert clock routes 752, 754 and repower LCBs 722, 724.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart, illustration, can be implemented by special purpose hardware-based systems that perform the specified functions or acts, or combinations of special purpose hardware and computer instructions.

Thus, the illustrative embodiments provide a physical synthesis tool for clock optimization with local clock buffer control optimization. Through careful order of optimizations, a physical synthesis tool can avoid or repair disruptions during the clock optimization stage of the placement driven synthesis (PDS) flow. Through this optimization, the physical synthesis tool can improve the overall flow significantly. The new flow consists of delaying the exposure of clock routes until after the clock optimization placement stage. The physical synthesis tool clones first local clock buffers. Then, the physical synthesis tool runs timing analysis on the whole design to compute the impact of this necessarily disruptive step. After cloning local clock buffers, the physical synthesis tool adds an extra optimization step to target the control signals that drive the local clock buffers. In one embodiment, this optimization step includes latch cloning, timing-driven placement, buffer insertion, and repowering. The flow alleviates high-fanout nets and produces significantly better timing going into clock optimization placement. After placement, the physical synthesis tool fixes latches and local clock buffers in place, inserts clock routes, and repowers local clock buffers.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for clock optimization with local clock buffer control optimization, the method comprising:
    receiving, by the data processing system, an integrated circuit design, wherein the integrated circuit design has at least one local clock buffer and wherein local clock buffer control signals to the at least one local clock buffer are hidden in the integrated circuit design;
    cloning, by the data processing system, the at least one local clock buffer in the integrated circuit design to generate a plurality of local clock buffers in the integrated circuit design;
    performing, by the data processing system, latch clustering to associate latches in the integrated circuit design with respective ones of the plurality of local clock buffers;
    responsive to performing latch clustering, exposing, by the data processing system, the local clock buffer control signals in the integrated circuit design; and
    performing, by the data processing system, local clock buffer control optimization to optimize paths of the local clock buffer control signals that drive the plurality of local clock buffers in the integrated circuit design to form an optimized integrated circuit design.

2. The method of claim 1, wherein performing local clock buffer control optimization comprises:
    performing pipeline latch cloning to clone at least one pipeline latch in control signals to the plurality of local clock buffers;
    performing timing-driven placement of individual gates along the paths of the latch control signals to the plurality of local clock buffers in the integrated circuit design; and
    performing buffer insertion to insert buffers in the paths of the local clock buffer control signals that drive the plurality of local clock buffers.

3. The method of claim 1, further comprising:
performing net weighting on the optimized integrated circuit design.

4. The method of claim 3, further comprising:
performing global clock optimization placement in the optimized integrated circuit design.

5. The method of claim 4, further comprising:
inserting clock routes and repowering local clock buffers in the optimized integrated circuit design.

6. The method of claim 5, further comprising:
performing reduced iron optimization on the optimized integrated circuit design.

7. The method of claim 1, further comprising:
performing iron optimization on the received integrated circuit design.

8. A computer program product for clock optimization with local clock buffer control optimization comprising a computer readable storage medium having a computer readable program stored therein, wherein the computer readable program, when executed on a computing device, causes the computing device to:
receive, by the computing device, an integrated circuit design, wherein the integrated circuit design has at least one local clock buffer and wherein local clock buffer control signals to the at least one local clock buffer are hidden in the integrated circuit design;
clone, by the computing device, the at least one local clock buffer to generate a plurality of local clock buffers in the integrated circuit design;
perform, by the computing device, latch clustering to associate latches in the integrated circuit design with respective ones of the plurality of local clock buffers;
responsive to performing latch clustering, expose, by the computing device, the local clock buffer control signals in the integrated circuit design; and
perform, by the computing device, local clock buffer control optimization to optimize paths of the local clock buffer control signals that drive the plurality of local clock buffers in the integrated circuit design to form an optimized integrated circuit design.

9. The computer program product of claim 8, wherein performing local clock buffer control optimization comprises:
performing pipeline latch cloning to clone at least one pipeline latch in control signals to the plurality of local clock buffers;
performing timing-driven placement of individual gates along the paths of the latch control signals to the plurality of local clock buffers in the integrated circuit design; and
performing buffer insertion to insert buffers in the paths of the local clock buffer control signals that drive the plurality of local clock buffers.

10. The computer program product of claim 8, wherein the computer readable program further causes the computing device to:
perform net weighting on the optimized integrated circuit design.

11. The computer program product of claim 10, wherein the computer readable program further causes the computing device to:
perform global clock optimization placement in the optimized integrated circuit design.

12. The computer program product of claim 11, wherein the computer readable program further causes the computing device to:
insert clock routes and repowering local clock buffers in the optimized integrated circuit design.

13. The computer program product of claim 8, wherein the computer readable program was downloaded over a network from a remote data processing system.

14. The computer program product of claim 8, wherein the computer readable program is downloaded over a network to a remote data processing system for use in the remote data processing system.

15. An apparatus for clock optimization with local clock buffer control optimization comprising:
a processor; and
a memory coupled to the processor, wherein the memory comprises instructions which, when executed by the processor, cause the processor to:
receive an integrated circuit design, wherein the integrated circuit design has at least one local clock buffer and wherein local clock buffer control signals to the at least one local clock buffer are hidden in the integrated circuit design;
clone at least one local clock buffer to generate a plurality of local clock buffers in the integrated circuit design;
perform latch clustering to associate latches in the integrated circuit design with respective ones of the plurality of local clock buffers;
expose local clock buffer control timing in the integrated circuit design; and
perform local clock buffer control optimization to optimize paths of control signals that drive the plurality of local clock buffers in the integrated circuit design to form an optimized integrated circuit design.

16. The apparatus of claim 15, wherein the instructions to perform local clock buffer control optimization cause the processor to:
perform pipeline latch cloning to clone at least one pipeline latch in control signals to the plurality of local clock buffers;
perform timing-driven placement of individual gates along the paths of the latch control signals to the plurality of local clock buffers in the integrated circuit design; and
perform buffer insertion to insert buffers in the paths of the local clock buffer control signals that drive the plurality of local clock buffers.

17. The apparatus of claim 15, wherein the instructions further cause the processor to:
perform net weighting on the optimized integrated circuit design.

18. The apparatus of claim 17, wherein the instructions further cause the processor to:
perform global clock optimization placement in the optimized integrated circuit design.

19. The apparatus of claim 18, wherein the instructions further cause the processor to:
insert clock routes and repowering local clock buffers in the optimized integrated circuit design.

20. The apparatus of claim 19, wherein the instructions further cause the processor to:
perform reduced iron optimization on the optimized integrated circuit design.

* * * * *